Oct. 8, 1968     W. B. HALL ET AL     3,405,299
VAPORIZABLE MEDIUM TYPE HEAT EXCHANGER FOR ELECTRON TUBES
Filed Jan. 27, 1967
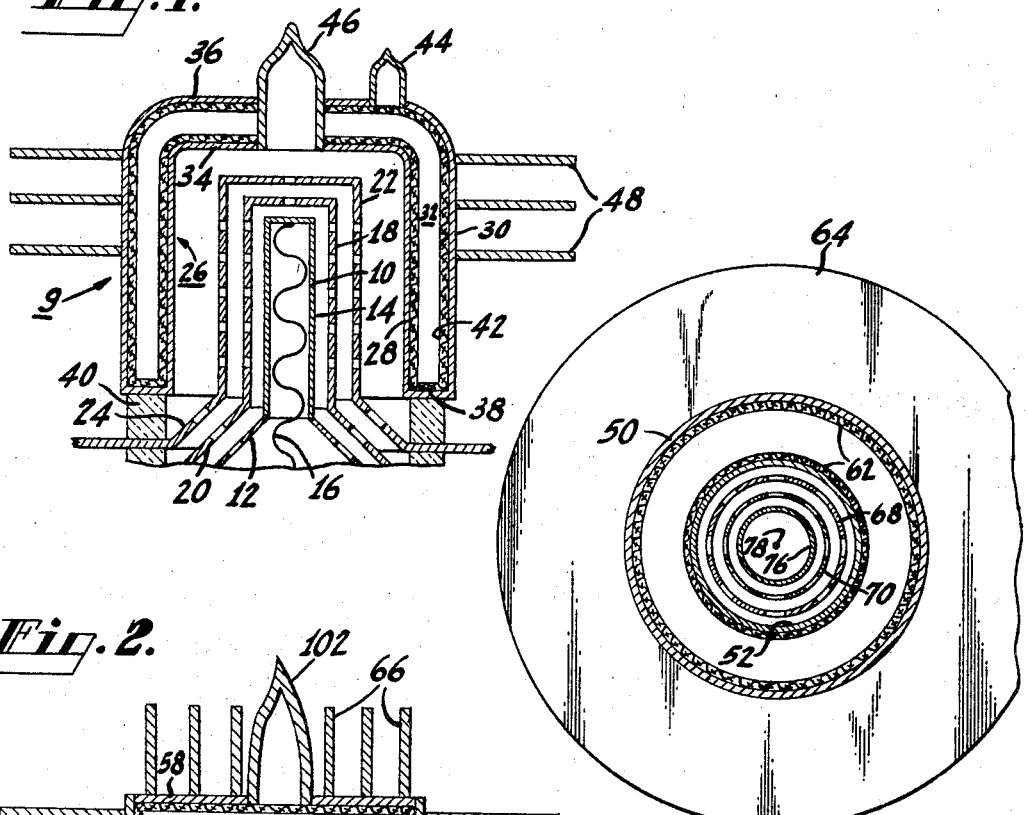
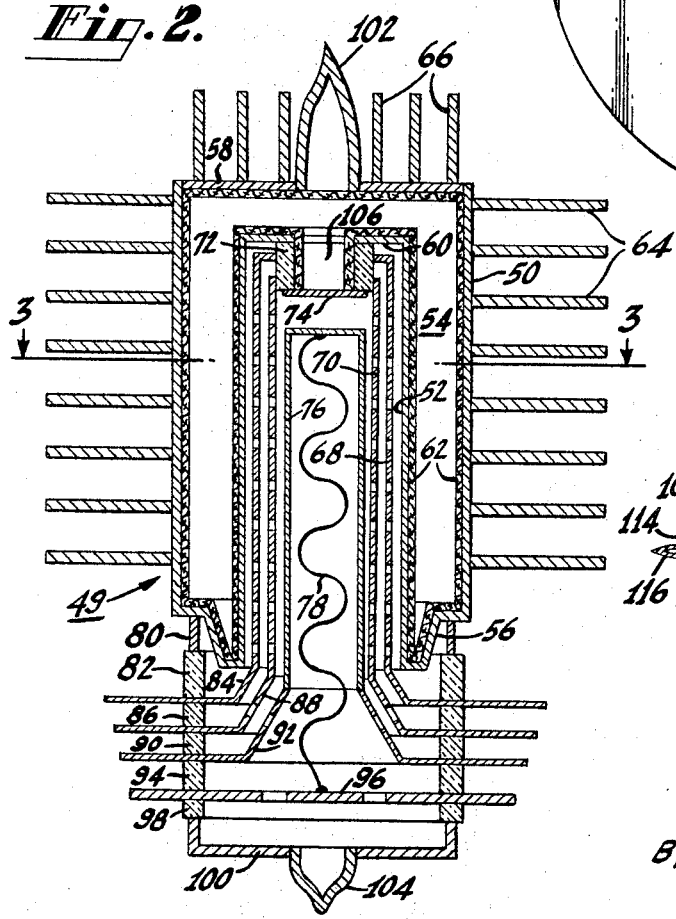
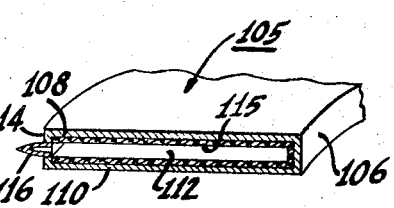
Inventors:
WILLIAM B. HALL AND
DONALD M. ERNST
By L. A. Larsen
Attorney United States Patent Office 3,405,299
Patented Oct. 8, 1968

3,405,299
**VAPORIZABLE MEDIUM TYPE HEAT EX-
CHANGER FOR ELECTRON TUBES**
William B. Hall, Lancaster, and Donald M. Ernst, East
Petersburg, Pa., assignors to Radio Corporation of
America, a corporation of Delaware
Filed Jan. 27, 1967, Ser. No. 612,181
4 Claims. (Cl. 313—12)

ABSTRACT OF THE DISCLOSURE

In a relatively high power electron tube having an exposed anode and an internal grid subjected to relatively high temperatures in operation, the anode and grid have structures incorporating a modified heat pipe principle for improved heat dissipation. The anode comprises a double walled cylindrical structure defining an annular space between the walls. The walls are lined with a capillary structure for transport of a vaporizable medium in the liquid state. The inner wall may not only serve as an anode for the tube but may extend into heat transfer relation with respect to the grid and thus constitute the heat input zone of a heat pipe. The outer wall serves as the heat dissipation zone of the heat pipe. Heat radiators at this zone may also constitute heat pipes.

BACKGROUND OF THE INVENTION

Field of the invention

The invention relates to an improved heat exchanger for electron tubes and particularly to a heat exchanger incorporating the principles of a heat pipe.

Description of the prior art

Some types of known electron tubes having electrodes such as an external anode and an internal grid, are operated at such high temperatures that the electrodes require cooling by artificial means. Cooling means heretofore available for the anode comprise the provision of a relatively large heat sink, and heat dissipation means for removing heat from the heat sink by radiation, convection or forced feed of a coolant. The relatively large heat sink is provided by relatively thick walls of the anode, made of a metal of relatively high thermal capacity such as copper. Prior means for dissipating heat from the heat sink has involved either the forced circulation of a liquid coolant in close proximity to the heat sink, or radiation from heat radiators mounted on the electrode in heat conductive relation with respect thereto. In some cases the heat radiators are subjected to a forced air flow to further increase the heat dissipation effected thereby. No completely satisfactory cooling means for an internal grid are known.

The cooling means heretofore provided involve problems of efficiency of heat dissipation as well as cost. Where a heat sink is employed, the heat input is directed to one surface of the heat sink and is dissipated from an opposite surface. Heat transfer from the heated surface to the cooled surface is effected by conduction through the material of the electrode. The efficiency of this type of heat transfer is not as high as desired particularly when appreciable fluctuations in heat input occur. Such appreciable heat fluctuations may result in a harmful heating of the heat input surface of the electrode as a consequence of the lag in heat transfer through the wall of the electrode. Such lag is characteristic of conductive heat transfer and results in a temperature gradient between the heat input surface of the electrode, for example the surface impinged by electrons, and the opposite surface associated with heat dissipation means. The fact that the cooler region of this temperature gradient is adjacent to the heat dissipation surface results in inefficient heat dissipation. In addition to lacking desired efficiency, some prior cooling means are costly because of the need for forced feed of the coolant. Such forced feed of the coolant involves costly apparatus requiring maintenance by skilled personnel.

SUMMARY OF THE INVENTION

The improved heat exchanger disclosed herein comprises in one example an annular heat pipe having radially spaced inner and outer walls defining an annular space. The facing inner surfaces of the aforementioned inner walls are lined with a capillary structure such as a wire mesh or porous body having openings of capillary size. A suitable vaporizable working medium is contained within the annular space. The inner wall of the heat pipe may comprise a heated anode of an electron tube and thus constitute the heat input zone of the heat pipe. The outer wall of the heat pipe may serve as the heat dissipation zone of the pipe. The outer wall by virtue of its area which is larger than that of the inner wall, may effectively dissipate heat to the ambient by radiation or convection, or supplemental means such as heat radiators may be employed. For increased heat dissipation from the heat radiators, each radiator may be in the form of an independent heat pipe. The inner and outer walls as well as the capillary structure are joined at one end of the heat pipe to provide a return path for the vaporizable medium in liquid form from the outer wall to the inner wall through the capillary structure.

When it is desired to cool a grid of a tube in addition to or apart from the anode thereof, the inner wall of the heat pipe may be provided with a suitable shape for engaging a heat conductive support for the grid for dissipating heat therefrom.

BRIEF DESCRIPTION OF THE DRAWING

In the drawing to which reference is now made for an exemplary embodiment of the invention:

FIG. 1 is a fragmentary sectional view of an electron tube in which the anode constitutes a portion of a heat pipe for efficient heat dissipation therefrom;

FIG. 2 shows a sectional elevation of an electron tube in which the heat pipe principle is employed for cooling both an anode and two grids of the tube;

FIG. 3 is a sectional view taken along the line 3—3 of FIG. 2 and shows the annular shape of the heat pipe structure in accordance with the present disclosure; and FIG. 4 is a fragmentary view partly in section of a disc or fin type heat radiator having a heat pipe structure.

DESCRIPTION OF THE PREFERRED EMBODIMENTS

The tube 9 shown in FIG. 1 comprises a cathode 10 mounted upon a support 12 and having a suitable electron emitting coating 14 thereon. A heater 16 electrically connected at one end to the upper end of cathode 10, as shown in FIG. 1, and at the other end to a lead (not shown) serves to heat the cathode 10 to electron emitting temperature. A control grid 18 surrounds the cathode 10 and is mounted on a lead-in support structure 20. A screen grid 22 surrounds the control grid 18 and is supported on a lead-in 24. The tube elements described may be similar to comparable elements employed in the electron tube shown in U.S. Patent No. 2,950,411 to Nekut et al., issued Aug. 23, 1960.

The anode 26 surrounding the screen grid 22 incorporates a modified heat pipe structure in accordance with the present disclosure. This structure is annular in shape and includes an inner wall 28 and an outer wall 30. The walls may be made of nickel for example and are relatively thin, i.e., about 25 mils thick. Materials other than nickel may be used provided they are compatible with the working medium of the heat pipe, the temperature of operation, and the external ambient. Considerations determining the minimum thickness are the internal pressure and external corrosion. Between the two walls is an annular space 32. The walls 28, 30 are joined at the top as viewed in FIG. 1 by transverse walls 34, 36 respectively. The lower ends of walls 28, 30 are bridged by an annular end wall 38. The end wall 38 is suitably fixed as by brazing to an insulating ring 40.

Within the annular space 32 and adjacent to the facing inner surfaces of walls 28, 30 is a capillary structure 42 made of a wire mesh or porous body having capillary openings therein. The material of which the capillary structure 42 is made should be able to withstand the operating temperature of the tube. When this temperature is not above 800° C., a copper mesh having capillary openings may serve as the capillary structure. The capillary structure engages all inner facing surfaces of walls 28, 30 as well as the inner surface of end wall 38 and the inner facing surfaces of transverse wall portions 34, 36. A vaporizable working medium compatible with the temperature of operation of anode 26 is included in the space 32. Sufficient amount of the working medium is provided so as to completely fill the capillary structure 42 when the working medium is in condensed form. When the operating anode temperature is about 150° C., the vaporizable working medium may be water, and at about 400° C., the vaporizable working medium may be cesium. The inner space 32 of the heat pipe anode 26 may be evacuated of all unwanted gases through an exhaust tubulation 44 shown sealed. The evacuating procedure may be similar to that described in U.S. patent application of William B. Hall, Ser. No. 589,987, filed Oct. 27, 1966 and assigned to the same assignee as the present application.

The electron tube 9 may be evacuated suitably through an exhaust tubulation 46 shown tipped off.

Any desired number of radiators 48 may be fixed to the outer surfaces of anode heat pipe wall 30 for radiating heat from such wall.

During operation, the surface of wall 28 facing inwardly of the electron tube 9 is heated by electrons impinging thereon. Due to the thinness of the wall 28 the heat generated in the aforementioned surface thereof is rapidly conducted to the capillary lining 42 on the opposite surface of wall 28, containing the vaporizable working medium. The heat so conducted to the capillary lining causes the working medium therein to vaporize. In vaporizing, the working medium takes up an appreciable amount of heat. The vaporized working medium migrates within the space 32 and condenses on and is absorbed by the relatively cool capillary structure positioned on the inner surfaces of the outer wall 30. In condensing, the vaporizable working medium releases latent heat of evaporation to the outer wall 30 from which the heat is suitably dissipated either by virtue of the relatively large surface area of the outer wall 30, or by means of supplemental heat dissipation means, such as radiators 48 for example.

The path traversed by the liquid medium in replenishing vacancies produced by evaporation of working medium adjacent to the inner wall 28 includes a radial portion provided by the capillary structure adjacent to the annular wall 38. The condensation of working medium in the portion of the capillary structure engaging the outer wall 30, provides a continuing source of liquid working medium for the capillary structure adjacent to the inner wall 28.

It will be noted that heat transfer from the inner wall 28 to the outer wall 30 is very rapid and free from the lag characterizing conductive heat transfer. Therefore, a temperature gradient between the inner wall 28 and the otuer wall 30 is substantially avoided with an attendant efficiency in heat dissipation from the heated surface of the tube.

In the embodiment shown in FIG. 2 a heat pipe is associated with an anode and two grids of an electron tube 49. The heat pipe includes features that are similar to those shown in FIG. 1. Thus, the heat pipe is an annular structure having an outer wall 50 and an inner wall 52 defining an annular space 54. The lower end of the space 54 as viewed in FIG. 2 is closed by an annular wall 56. A transverse portion of the heat pipe structure comprises an outer wall 58 and an inner wall 60. The several walls may be made of materials similar to those described in connection with FIG. 1.

The inner surfaces of the walls 50, 52, 56, 58 and 60 are lined with a capillary structure 62 which may be a wire mesh made of copper for example or other porous body having capillary openings therein. A vaporizable working medium similar to that employed in the tube shown in FIG. 1, is provided in sufficient quantity to fill the capillary structure 62 when in the liquid state.

The inner wall 52 of the heat pipe serves as the anode of the tube 49 and the outer wall constitutes a heat dissipation region of the heat pipe. For dissipating heat from the outer wall 50 one or more disc type heat radiators 64 may be suitably fixed to wall 50. Rectilinear radiators 66 may be used to radiate heat from the outer transverse wall 58.

For cooling two grids 68, 70 of the tube 49 the upper adjacent ends of the grids as shown in FIG. 2 are suitably fixed as by brazing to spaced portions of an insulating ring 72 made of a good heat conducting material such as beryllium oxide. The end wall 60 of the heat pipe is fixed as by brazing to the upper end of the insulating ring 72. A metal plate 74 is fixed to the lower end of ring 72, for hermetically sealing the heat pipe from the interior of tube 49. The capillary structure 62 extends across the transvers wall 60 and into engagement with the inner surface of the insulating ring 72. The metal plate 74 is free of capillary structure to avoid cooling an adjacent cathode 76 having a heater 78.

Suitable supports for the electrodes of the tube 49 are provided. The lower end portion of the heat pipe anode 52 as viewed in FIG. 2 is suitably fixed to a metal ring 80 which in turn is fixed to an insulating ring 82. A support 84 for grid 68 is fixed between insulating rings 82 and 86. A support 88 for the grid 70 is fixedly sandwiched between insulating rings 86, 90. A support 92 serving the cathode 76 is fixed between insulating rings 90, 94, and finally a lead-in 96 for the heater 78 is fixed between insulating rings 94, 98. A metal end plate 100 fixed to insulating ring 98 serves to close the tube envelope.

The inner ambient 54 of the heat pipe anode is suitably evacuated of undesired gases through an exhaust tubulation 102, after which it is pinched off as shown in FIG. 2. The envelope of tube 49 is evacuated through an exhaust tubulation 104 after which the tubulation is hermetically closed as by a pinch off as shown. The exhaust tubulation 104 is located at the bottom of the tube as viewed in FIG. 2, because of the crowded condition of the upper portion of the tube caused by the reentrant end portion 106 of the region of the heat pipe associated with grid support 72.

The operation of the tube shown in FIG. 2 insofar as heat dissipation is concerned, is similar to that disclosed before herein except for the cooling of the two grids 68, 70. These grids are cooled by conduction of heat therefrom through the insulating ring 72 and to the capillary lining 62. If the heat flux transmitted from the grids to the capillary lining 62 is sufficiently high to cause the working medium in the capillary lining to vaporize, heat will be extracted from the ring 72 as well as from grids 68, 70 connected thereto.

For further increasing heat dissipation from the outer wall 50 of the anode heat pipe, each of the radiators 64 may comprise a heat pipe structure 105 as shown in FIG. 4. In this example, the wall 106 of the radiator-type heat pipe is in heat transfer engagement with the outer wall 50 of the anode heat pipe. Walls 108, 110 constitute heat dissipation regions. The annular chamber 112 formed by walls 106, 108 and 114 is lined with a capillary structure and contains a vaporizable medium both of which may be of the type previously described herein. The chamber 112 is suitably evacuated of undersired gases through an exhaust tubulation 116 after which the tubulation is pinched off as shown in FIG. 4.

The radiator 105 in the form of a heat pipe, radiates heat more efficiently than a conventional radiator 64 shown in FIGS. 2 and 3. In a conventional radiator the temperature is lower at the free peripheral end of the radiator than at the region thereof in contact with a wall 50 to be cooled. The heat pipe radiator 105 on the other hand is substantially just as hot at its free periphery during operation as at its inner periphery which is in direct engagement with the surface to be cooled. Since more heat is dissipated by radiation at a higher temperature than at a lower one, the heat pipe radiator, by virtue of its uniform temperature throughout all portions thereof, radiates heat more efficiently than the variable temperature conventional type of radiator.

The annular heat pipe structure shown in FIG. 1 may also be employed in applications wherein the inner wall 28 does not constitute an anode. For example, the heat pipe may be an independent structure having dimensions for snug telescoped relation over a conventional external tube anode. However, such arrangement will be accompanied by some reduction in heat transfer efficiency because of the relatively large combined thickness of the external anode of the tube and the inner wall 28 of the heat pipe. But such reduced efficiency will still be greater than that of conventional heat dissipation systems because of the appreciably higher heat transfer that is characteristic of a heat pipe.

Furthermore, the radiator-type heat pipe 105 shown in FIG. 4 may also be used with a conventional external anode of an electron tube, with increased heat dissipating efficiency over prior cooling means.

We claim:
1. An anode of an electron tube comprising:
    (a) a first tubular portion,
    (b) a second tubular portion within and coaxial with said first tubular portion, and adapted to be heated by electron impingement thereon,
    (c) the side walls of said tubular portions being spaced radially to provide an annular space,
    (d) an annular end wall joining said first and second tubular portions,
    (e) means including a capillary structure and a vaporizable working medium within said annular space and over the inner surface of said annular end wall and said tubular portions for transferring heat radially from said second tubular portion to said first tubular portion, and
    (f) means engaging the outer surface of said first tubular portion for dissipating heat from said first tubular portion.

2. A heat exchanger comprising:
    (a) a heat pipe structure having inner and outer radially spaced cylindrical walls, said cylindrical walls defining an annular space,
        (1) the inwardly facing surfaces of said walls having thereon a capillary structure,
        (2) a working medium in said annular space that is vaporizable only at and above the operating temperature of said tube,
    (b) the inner of said walls comprising a heat input zone, and the outer of said walls comprising a heat dissipation zone,
    (c) an end wall joining said inner and outer walls, said capillary structure extending over the inner surface of said end wall, and
    (d) a heat radiator mounted on the outer surface of said outer wall.

3. An electron tube having an elongated grid and a tubular anode surrounding said grid, said tubular anode having a closed end portion,
    (a) said anode having double walls at said closed end portion defining a space,
    (b) an insulating heat-transfer member extending from said grid to the inner of said double walls at said closed end portion,
    (c) the inner surfaces of said walls and said heat transfer member having a capillary structure thereon, said capillary structure extending from one of said walls to the other,
    (d) said space containing a working medium vaporizable at the operating temperature of said grid, whereby heat is transferred from said grid to the outer of said double walls.

4. An electron tube in accordance with claim 3 and wherein means for dissipating heat is provided on said outer of said double walls.

References Cited
UNITED STATES PATENTS

| | | | |
|---|---|---|---|
| 2,466,565 | 4/1949 | Stivin | 313—21 |
| 3,227,905 | 1/1966 | Talcott | 313—44 X |
| 3,229,759 | 1/1966 | Grover | 165—105 |

JAMES W. LAWRENCE, *Primary Examiner.*

DAVID GALVIN, *Examiner.*

C. R. CAMPBELL, *Assistant Examiner.*